(12) United States Patent
Zhang et al.

(10) Patent No.: US 8,874,695 B2
(45) Date of Patent: Oct. 28, 2014

(54) WEB ACCESS USING CROSS-DOMAIN COOKIES

(75) Inventors: Lizhong Zhang, Hangzhou (CN); Jian Mei, Hangzhou (CN); Baohui Pang, Hangzhou (CN); Siheng Yu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/599,272

(22) PCT Filed: Mar. 23, 2009

(86) PCT No.: PCT/US2009/037967
§ 371 (c)(1),
(2), (4) Date: Nov. 6, 2009

(87) PCT Pub. No.: WO2009/117733
PCT Pub. Date: Sep. 24, 2009

(65) Prior Publication Data
US 2010/0198911 A1    Aug. 5, 2010

(30) Foreign Application Priority Data
Mar. 21, 2008    (CN) .......................... 2008 1 0084419

(51) Int. Cl.
*G06F 15/16*    (2006.01)
*G06F 15/173*    (2006.01)
*G06F 17/30*    (2006.01)
*H04L 29/08*    (2006.01)

(52) U.S. Cl.
CPC ........... *G06F 17/30899* (2013.01); *H04L 67/22* (2013.01); *H04L 67/20* (2013.01); *H04L 67/146* (2013.01)
USPC ............................ 709/219; 709/203; 709/224

(58) Field of Classification Search
CPC ....... H04L 67/146; H04L 67/22; H04L 67/20; H04L 17/30899
USPC .................................................. 709/203, 224
See application file for complete search history.

(56) References Cited

U.S. PATENT DOCUMENTS 7,594,107 B1 * 9/2009 Parkhill ......................... 713/156
7,779,103 B1 * 8/2010 Fikes et al. .................... 709/223

(Continued)

FOREIGN PATENT DOCUMENTS

CN    1812403 A    8/2006
CN    101075240 A    11/2007

(Continued)

OTHER PUBLICATIONS

Translation of Chinese office action from counterpart Chinese patent application No. 200810084419.4, dated Mar. 12, 2012, 16 pages.

(Continued)

*Primary Examiner* — Viet Vu
*Assistant Examiner* — Herman Belcher
(74) *Attorney, Agent, or Firm* — Lee & Hayes, PLLC

(57) ABSTRACT

A cookie server generates a public cookie which uniquely identifies a client and is adapted for the client to access multiple operator servers that are recognized by the public cookie. When an operator server receives an access request from the client without a valid public cookie recognizing the operator server, it redirects the access request to the cookie server, which generates a public cookie, redirects the access request back to the operator server and passes along the public cookie. The operator server then writes the public cookie into the client and binds itself with the public cookie. A public cookie may include a group of related cookies identifying the common client that are generated this way to allow the same client's activities to be tracked by different operator servers having different domain names over the Internet.

16 Claims, 6 Drawing Sheets

(56) References Cited

U.S. PATENT DOCUMENTS

| | | | |
|---|---|---|---|
| 7,908,649 B1* | 3/2011 | Arora et al. | 726/7 |
| 2002/0161835 A1 | 10/2002 | Ball et al. | |
| 2002/0178166 A1* | 11/2002 | Hsia | 707/100 |
| 2003/0037131 A1 | 2/2003 | Verma | |
| 2004/0015580 A1* | 1/2004 | Lu et al. | 709/224 |
| 2004/0133634 A1* | 7/2004 | Luke et al. | 709/203 |
| 2004/0250059 A1 | 12/2004 | Ramelson et al. | |
| 2005/0204041 A1 | 9/2005 | Blinn et al. | |
| 2005/0216582 A1 | 9/2005 | Toomey et al. | |
| 2006/0155857 A1* | 7/2006 | Feenan et al. | 709/227 |
| 2006/0265495 A1* | 11/2006 | Butler et al. | 709/224 |

FOREIGN PATENT DOCUMENTS

| | | |
|---|---|---|
| CN | 101251858 A | 8/2008 |
| CN | 100438421 C | 11/2008 |
| JP | 11212912 | 8/1999 |
| JP | 2006039810 | 2/2006 |
| JP | 2010501939 | 1/2010 |
| WO | WO2008022339 | 11/2008 |

OTHER PUBLICATIONS

Translation of Chinese office action from counterpart Chinese patent application No. 200810084419.4, dated Mar. 29, 2011, 10 pages.

Translation of Chinese office action from counterpart Chinese patent application No. 200810084419.4, dated Sep. 15, 2011, 13 pages.

Translated Japanese Office Action mailed Apr. 30, 2013 for Japanese patent application No. 2011-501012, a counterpart foreign application of U.S. Appl. No. 12/599,272, 6 pages.

The Extended European Search Report mailed Dec. 15, 2011 for European patent application No. 09722680.7, 9 pages.

Samar, "Single Sign-On Using Cookies for Web Applications", Proceedings IEEE 8th International Workshops on Enabling Technologies: Infrastructure for Collaborative Enterprises, Jun. 16-18, 1999, Stanford, CA, IEEE Computer Society Press, pp. 158-163.

The Japanese Office Action mailed Mar. 4, 2014 for Japanese patent application No. 2011-501012, a counterpart foreign application of U.S. Appl. No. 12/599,272, 6 pages.

* cited by examiner

WEB ACCESS USING CROSS-DOMAIN COOKIES

RELATED APPLICATIONS

The present application is a National Stage application of an International Patent Application PCT/US09/037967, filed Mar. 23, 2009, and entitled "WEB ACCESS USING CROSS-DOMAIN COOKIES", which claims priority benefit from the Chinese patent application No. 200810084419.4, filed Mar. 21, 2008, entitled "METHOD, SYSTEM AND APPARATUS FOR WEB ACCESS USING CROSS-DOMAIN COOKIES", which applications are hereby incorporated in their entirety by reference.

TECHNICAL FIELD

The present disclosure relates to fields of networking technologies, and particularly to methods, systems and apparatuses for web access using cross-domain cookies.

BACKGROUND

Internet cookie is a technology that allows a website server storing a little amount of data into hard disk or memory of a client, or reading data from hard disk of a client. Because of its simplicity, Internet cookie technology has made browsing a web page much easier. Almost every webmaster has used cookies both for providing a superior browsing environment for visiting users, and for collecting information of the visiting users more accurately.

Cookies is a small text file placed by a Web server into a client's hard disk when a certain website is being browsed, and records such user information as user ID, password, web page(s) visited, and duration of stay. When the user re-visits the website, the website may obtain related information of the user by reading the cookies, and perform relevant operations such as displaying a welcome sign on a web page, or allowing direct user login without entering the ID and the password. In essence, cookies may be considered as a user identification card.

Cookies can neither be executed like a code, nor transmit a virus. Furthermore, a cookie is proprietary to a certain user, and can only be read by a server of the domain that has provided the cookie. Stored pieces of information are saved in a form of name-value pairs, with each name-value pair being merely a named data and nothing more. A website can only obtain information which the website has placed on a user computer, but not information from other cookies files, or any other information in the user computer. Most contents in cookies are encrypted, and are meaningless combinations of alphabets and numbers from the general user's point of view. Only a CGI (i.e., Common Gateway Interface) process of a server may know the true meaning of the cookies. Therefore, a cookie is like an identification card, is proprietary, and can only be read by a website to which the cookies belongs.

However, since cookies is proprietary under existing technologies, each operator or service provider on the Internet can only track activities of a user in its own website. Because each operator can only read its own cookies, the activities of the user obtained a single operator are usually incomplete.

SUMMARY

The exemplary embodiments of the present disclosure provide a method and a system for web access using cross-domain public cookies, enabling tracking activities of a user in an entire network using such public cookies.

The method uses a cookie server to generate a public cookie which identifies a client and allows the client to access multiple operator servers which are recognized by the public cookie. When an operator server receives an access request from the client, it redirects the access request to the cookie server, which then generates a public cookie, and redirects the access request back to the operator server and passes along the public cookie. The operator server then writes the public cookie into the client. The operator server may also bind itself with the public cookie. The public cookie uniquely identifies the client and becomes one of a group of public cookies identifying the common client and used by the client for accessing a plurality of operator servers each recognizable by a respective one of the group of public cookies. The group of public cookies identifying the common client are generated in likewise manner through multiple operator servers to allow the same client's activities to be tracked by different operator servers having different domain names over the Internet. The group of public cookies may each be bound to one of the operator servers having different domains.

The group of public cookies may be used for tracking activities of the client through a plurality of operator servers having different domains over a network. As each operator server tracks activities of the client on a respective domain, tracking cross domain activities of the client is made possible by collecting the results of activities of the client tracked by the plurality of operator servers.

In one embodiment, the public cookie identifies the client using a name-value created for the client and assigned to the public cookie. The public cookie may be banned with the respective operator server by storing the public cookie and its value under a domain of the operator server.

In one embodiment, a method for web access using cross-domain cookie includes the following procedures: provide in an operator server a cookie processing module used for public cookie detection; receive at the operator server an access request of a client; determine using the public cookie processing module of the operator server whether the access request includes a public cookie, and if negative obtain a public cookie from a cookie server; and store the public cookie into the client and binding the public cookie with the operator server using the cookie processing module of the operator server. The public cookie is being adapted for accessing multiple operator servers that are recognized by the public cookie.

Upon detecting that the access request includes a public cookie, the method may determine whether the public cookie has expired, and if expired, obtaining the public cookie from the cookie server. The operator server may specify a ratio for obtaining public cookies.

The present disclosure further provides a system for web access using cross-domain cookie. The system includes a cookie server and an operator server having a cookie processing module. The operator server is used for receiving an access request from a client. The cookie processing module is used for determining whether the access request includes a public cookie, and if negative sending a redirect request to the cookie server for obtaining a public cookie. The public cookie is adapted for allowing accessing multiple operator servers that are recognized by the public cookie. The cookie server is used for receiving the redirect request from the operator server, and generating and providing the public cookie to the operator server.

In one embodiment, the cookie processing module includes a receiving sub-module used for receiving the access request of the client; a determination sub-module used for determining whether the access request includes the public cookie, an acquisition sub-module used for obtaining the public cookie from the cookie server; and a binding sub-module used for storing the public cookie into the client and binding the public cookie with the operator server. The cookie processing module may further include a validity determination sub-module for determining whether the public cookie has expired, and for triggering the acquisition sub-module if expired. The cookie processing module may also include a request ratio control sub-module for specifying a ratio for obtaining public cookie.

In one embodiment, the cookie server includes a redirect request receiving module used for receiving a redirect request from the operator server; and a public cookie sending module for sending a redirect response including the public cookie to the operator server. The cookie server may further include a public cookie creation module used for creating the public cookie for a client.

When a user (a client) accesses a certain website, web address is redirected to the cookie server for acquiring a public cookie if the access request indicates that the user does not have the public cookie. Upon successful acquisition of fee public cookie, the cookie server redirects web address back to the web address which the user originally accessed. In this manner, each website may obtain a public cookie from the cookie server uniquely identifying the user. Because the public cookies are created by a commonly shared cookie server, all public cookies created for the same client have the same identification (e.g., identical name value or ID value) regardless of which website the user has accessed. Multiple websites obtain a group of public cookies uniquely identifying the same user, making it possible to track activities of the user throughout entire network using the public cookies.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The disclosed method and the system for web access using cross-domain cookie are described in further detail using exemplary embodiments as illustration. In this description, "a public cookie" may either refer to a specific cookie bound to a particular operator server (or a domain associated it with) or to a group of related cookies identifying a common client (e.g., a user machine) which are each bound to a different operator server, depending on the context and description level.

In this description, the order in which a process is described is not intended to be construed as a limitation, and any number of the described process blocks may be combined in any order to implement the method, or an alternate method.

Figure 1:
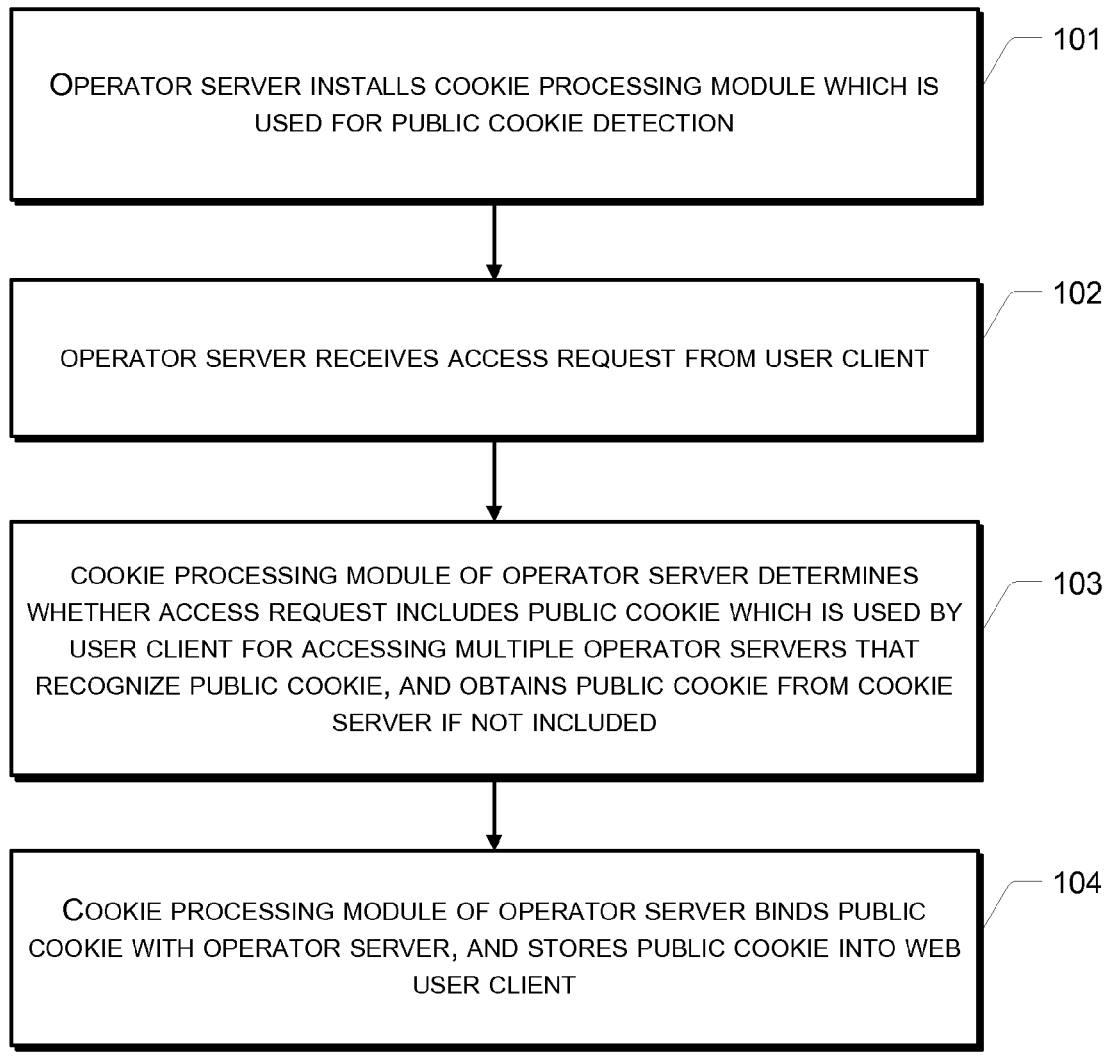
FIG. 1 shows a flow chart of an exemplary method for web access using cross-domain cookie in accordance with one embodiment.

FIG. 1 shows a flow chart of an exemplary method for web access using cross-domain cookie in accordance with one embodiment.

At Block 101, an operator server installs a cookie processing module. The cookie processing module is used for public cookie detection and for performing other acts of processing public cookies, as illustrated herein. The cookie processing module may be software based, hardware-based or a combination of software and hardware.

At Block 102, the operator server receives an access request from a client (e.g. a web client). A typical client is a user machine such as the PC. The access request is typically sent by the browser installed on the client.

At Block 103, the cookie processing module of the operator server determines whether the access request includes a public cookie which recognizes the operator server (or a domain associated therewith). The public cookie is used by the client for accessing multiple operator servers that are recognized by the public cookie. In this description, the public cookie may either be a single cookie or a group of separate cookies (cookie files) identifying a common client for accessing multiple operator servers each recognizable by one of the group of public cookies.

If the access request does not include a public cookie recognized by the operator server, the cookie processing module redirects the client to be cookie server, which generates a public cookie.

If the cookie processing module detects that the access request includes a public cookie, the cookie processing module further determines whether the public cookie has expired. If the public cookie has expired, the cookie processing module obtains a new public cookie from the cookie server. The operator server may further specify a ratio for obtaining public cookie is will be described herein.

At Block 104, the cookie processing module of the operator server binds the public cookie with the operator server (or with a domain name associated therewith) so that the operator server is recognized by the public cookie for the next visit by the same client. One way to bind the public cookie with the operator server is to let the operator server write the public cookie into the client and store the public cookie under the domain of the operator server.

In order to facilitate tracking of the user activities, operator server may further associate itself (or a domain associated therewith) with the public cookie and establish a data record for the associated client to keep user activity information such as the number of visits, duration of the visit, webpages visited, etc. Each operator server maintains its own data record for the associated client. But because the same client is consistently identified through the public cookie generated and registered in the above manner, it is possible to collectively track use activities on different domains over the network.

The disclosed method can be used for web access using cross-domain cookie when different operator servers having different domains are used with the cookie server in like manner.

Figure 2:
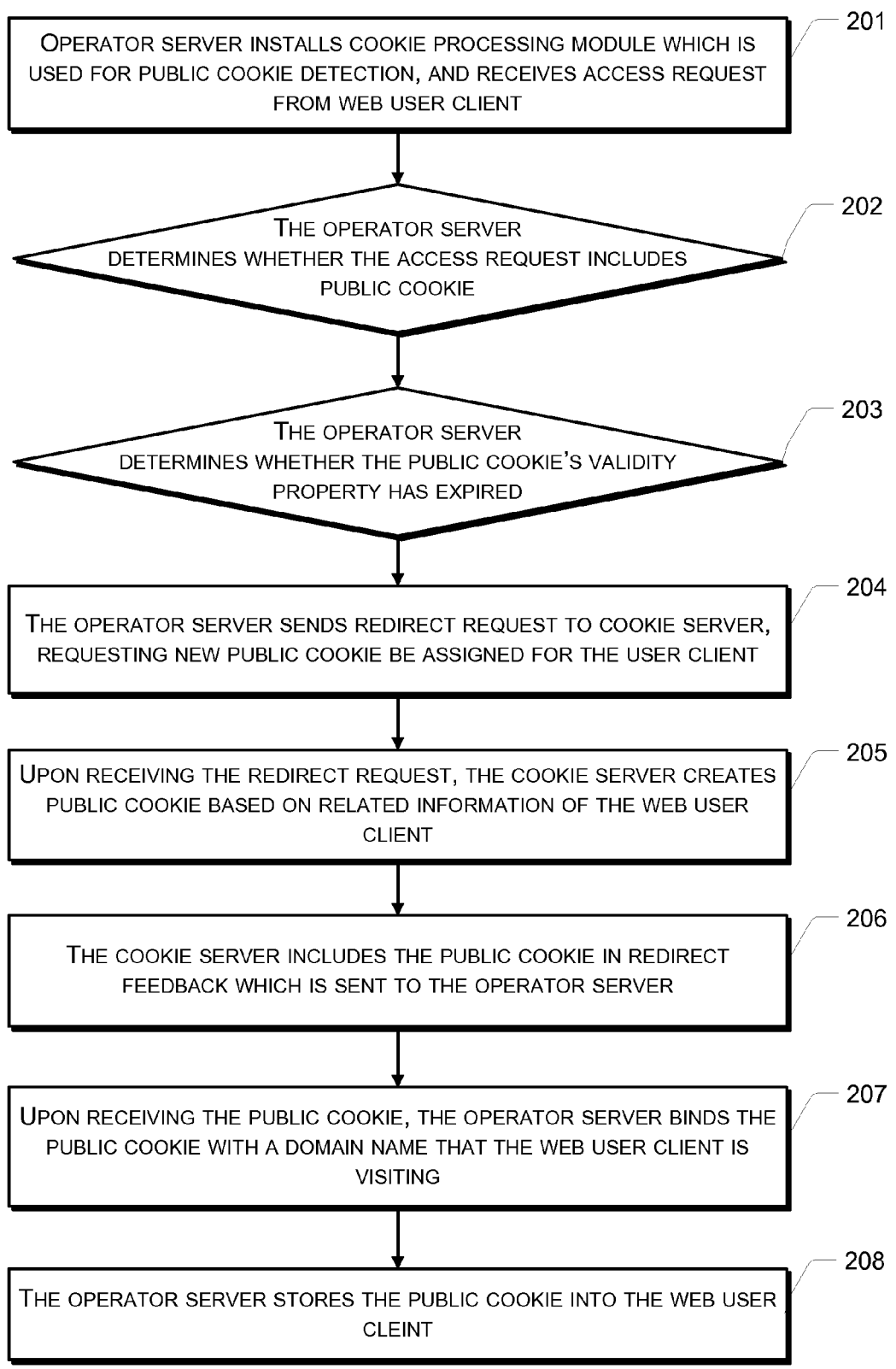
FIG. 2 shows a flow chart of another exemplary method for web access using cross-domain cookie in accordance with one embodiment.

FIG. 2 shows a flow chart of another exemplary method for web access using cross-domain cookie in accordance with one embodiment.

At Block 201, an operator server installs a cookie processing module for public cookie detection and for other public cookie processing. The operator server receives an access request from a client (e.g., a web client).

At Block 202, the operator server determines whether the request includes a public cookie that recognizes the operator server. If the request does not include such a public cookie (e.g., the client is visiting the operator server for the first time), the process proceeds to Block 204. If the request includes the public cookie, the process continues to Block 203.

A public cookie has a universal identifier of the same client for accessing multiple operator servers. Specifically, a client having a public cookie may visit multiple operator servers that are recognized by the public cookie. A public cookie may include a group of related cookies sharing the same universal identifier of the same client. Each cookie is created in relation to one of the multiple operator servers to recognize the respective operator server.

At Block 203, the operator server determines the public cookie's validity property. If the validity property of the public cookie is set to be permanent, the public cookie remains valid. If a deadline is set in the validity property of the public cookie, the operator server determines whether the deadline has been passed. If not, the public cookie is valid, and the client is allowed to obtain information from the operator server (or the operator server is allowed to access the public cookie of the client). If expired, the process proceeds to Block 204.

At Block 204, the operator server sends a redirect request to a cookie server, requesting a new public cookie be assigned to the client. The redirect request includes such related information of the client as user identifier and password.

Optionally, the operator server may determine whether to open or close the cookie processing module in the operator server depending on the circumstance. The cookie processing module may specify a ratio for obtaining public cookie through pre-configured transmission traffic or user designated requirement. For example, suppose data is guaranteed not to be delayed and/or dropped during transmission when data traffic between the operator server and the cookie server is within 1M, but 2M of bandwidth is required if the operator server receives ten thousand access requests of users with a full workload, the operator server may optimally choose to process only 50% of the accesses requests of the in order to maintain reliable data transmission.

At Block 205, upon receiving the redirect request, the cookie server creates the public cookie according to the related information of the client. The cookie server may first inquire whether the public cookie of the client is stored locally (at the cookie server or at a location accessible by the cookie server). If the public cookie of the client is already stored, the stored public cookie may be used directly.

At Block 206, the cookie server redirects the web access of the client to the operator server and includes the public cookie in the redirect response which is sent to the operator server.

At Block 207, upon receiving the public cookie, the operator server binds the public cookie with a domain name that is visited by the client. To accomplish this, the operator server stores values of the public cookie under a public cookie area of the domain name presented visited. This enables the operator server to keep information of the client.

At Block 208, the public cookie is saved in the client by the operator server and is used next time when the client visits the operator server. Transmitting the public cookie from the operator server to the client includes configuring a public cookie header as a portion of HTTP (i.e., Hypertext Transfer Protocol) feedback. The configured public cookie header is created by a CGI process, and may include the following properties: name, date, path, domain, and security parameter. The "name" property includes data associated with the client that is used by a related website. Public cookie may have multiple "name" attributes, and a feedback of the operator server may send multiple configured public cookie headers. The "date" property refers to a date which indicates an expiration date of the public cookie. The "path" property refers a subset of URL (i.e., Uniform Resource Locator) within domain(s) where the public cookie is valid. The "domain" property is an Internet domain name of the website. The "security" property refers to requirement(s) of sending the public cookie. For example, if the "security" property of public cookie is labeled as "safe", the public cookie is transmitted only when a communication channel between the operator server and the client is secure.

Figure 3:
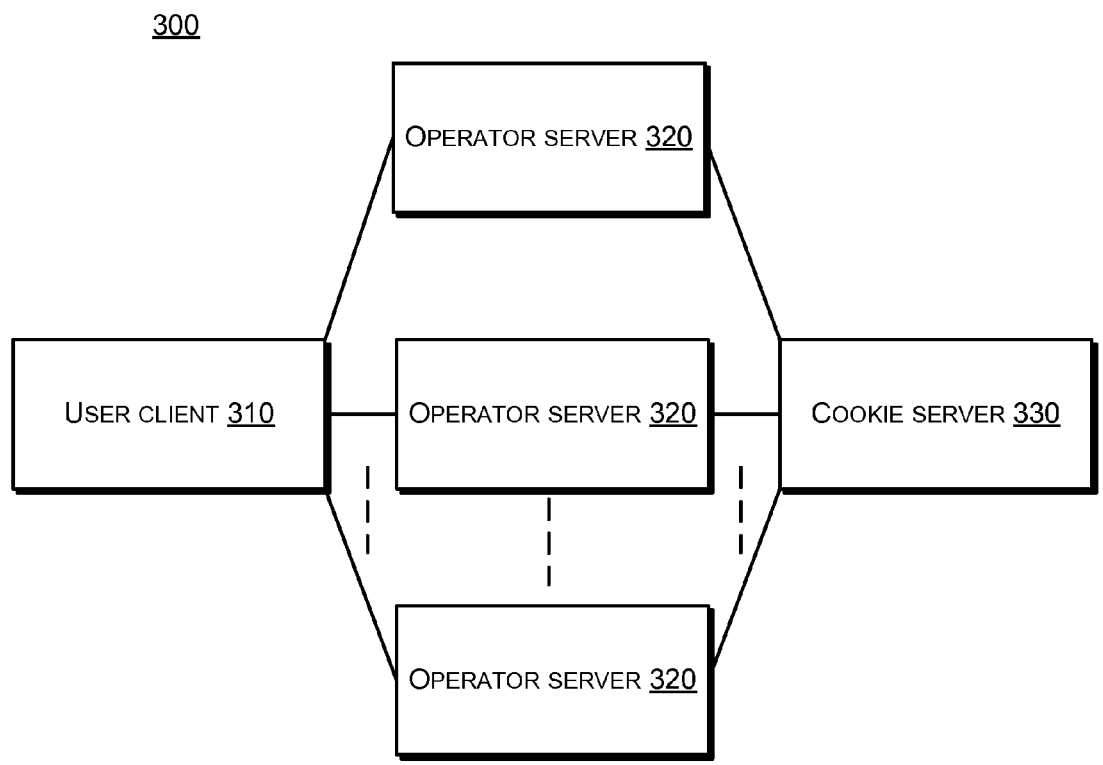
FIG. 3 shows a structural diagram of an exemplary system for web access using cross-domain cookie in accordance with one embodiment.

FIG. 3 illustrates an exemplary system for web access using cross-domain cookie. The system 300 includes a client 310, multiple operator servers 320, and cookie server 30. The client can is used for sending an access request to one of the operator servers 320. Each of the multiple operator servers 320 has installed therein a cookie processing module (e.g., apache module-mod_acookie) which is used for receiving the access request from the client, determining whether the access request includes a public cookie, and sending a redirect request to cookie server 330 for obtaining the public cookie if a public cookie is not included. As described herein, the public cookie is used by the client 310 for accessing any of the multiple operator servers 20 that are recognized by the public cookie.

The cookie server 330 is used for receiving the redirect request from the operator server 320, and providing the public cookie to the operator server 20.

Figure 4:
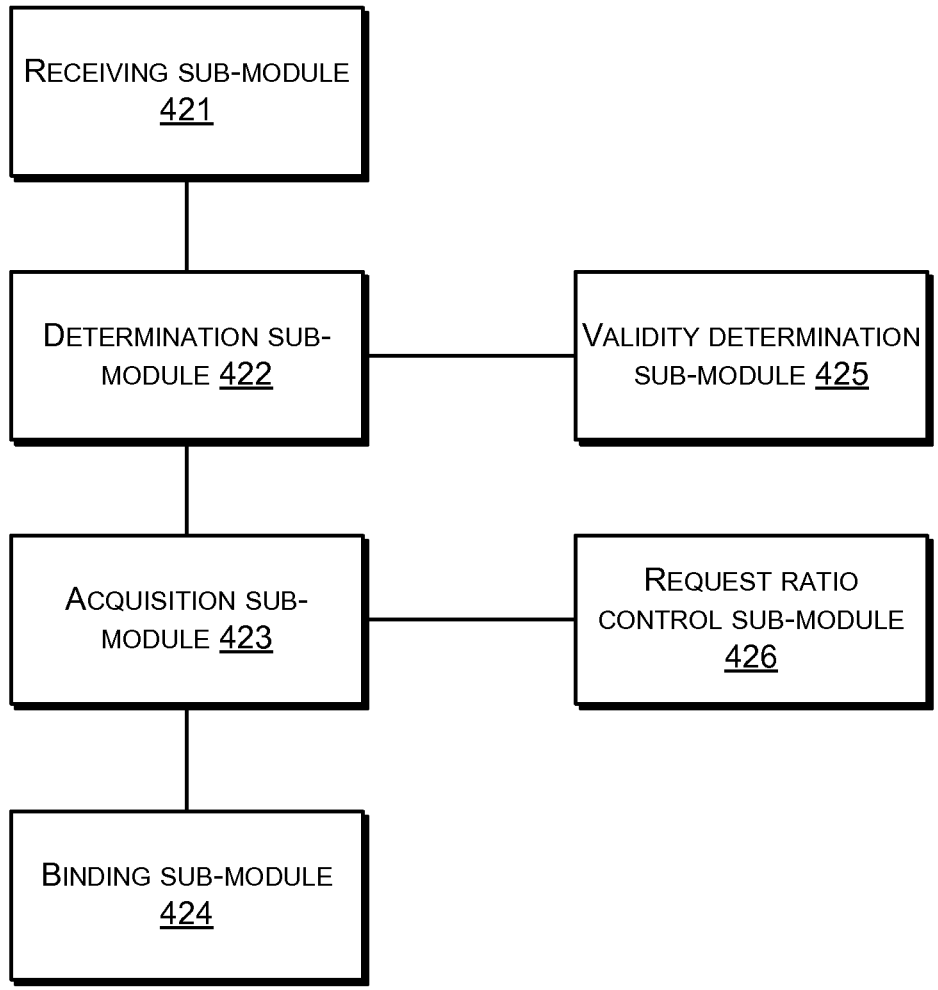
FIG. 4 shows a structural diagram of an exemplary operator server in accordance with one embodiment.

FIG. 4 illustrates an exemplary cookie processing module of an operator server (e.g. operator server 320). Operator server 420 includes a receiving sub-module 421 used for receiving an access request of a client; a determination sub-module 422 used for determining whether the access request includes a public cookie; an acquisition sub-module 423 used for obtaining the public cookie from a cookie server; and a binding sub-module 424 used for binding the public cookie with an operator server, saving value of the public cookie into a public cookie area of a domain name presently visited, and saving the public cookie into the client.

The operator server 420 also includes a validity determination sub-module 425, used for determining whether the public cookie has expired, and for triggering the acquisition sub-module 423 if expired; and a request ratio control sub-module 426, used for specifying a ratio for obtaining public cookie.

Figure 5:
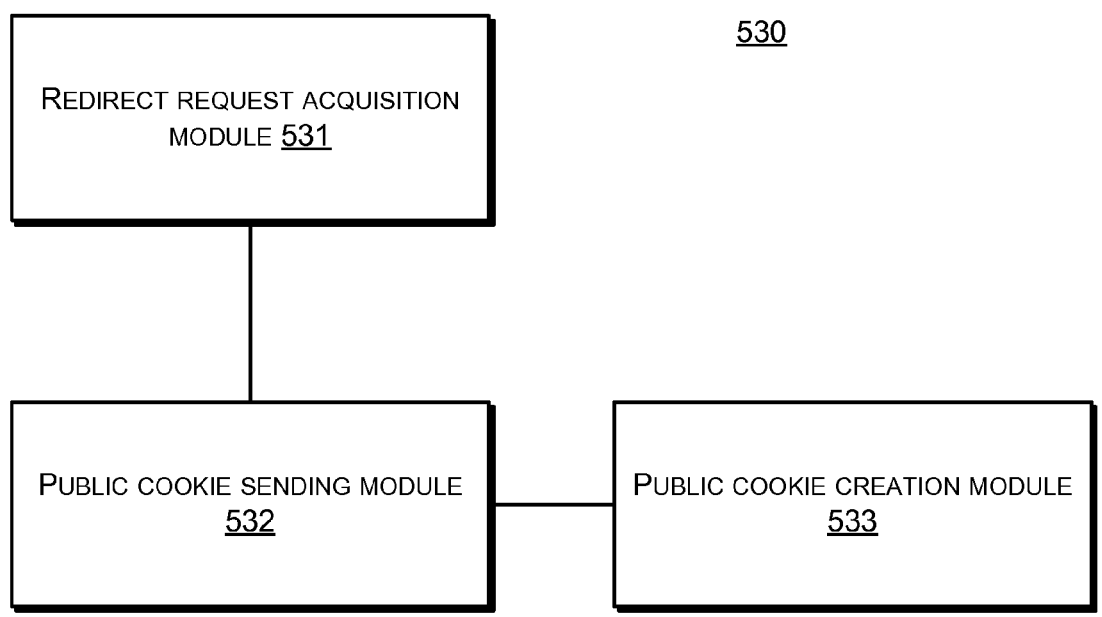
FIG. 5 shows a structural diagram of a exemplary cookie server in accordance with one embodiment.

FIG. 5 illustrates an exemplary cookie server (e.g., cookie server 330). Cookie server 530 includes a redirect request receiving module 531 used for receiving a redirect request from an operator server; a public cookie sending module 532 used for sending a redirect response having a public cookie to the operator server; and a public cookie creation module 533 used for creating the public cookie for a client.

In one embodiment, an operator server which needs to track activities of a user has a cookie processing module installed therein (e.g., an apache module mod_acookie used for examining a request received from the user). Upon detecting that the user is not assigned a public cookie, or the public cookie has expired, the cookie processing module automatically sends a redirect request to a cookie server for obtaining a new public cookie.

The cookie server primarily performs the following functions: receiving a request; creating a public cookie; and redirecting the request back to the operator server. Only if a user accesses a certain website for the first time, or a public cookie has expired, will the system redirect the access to the cookie server. Therefore, the data traffic pressure on the cookie server is not too great.

Figure 6:
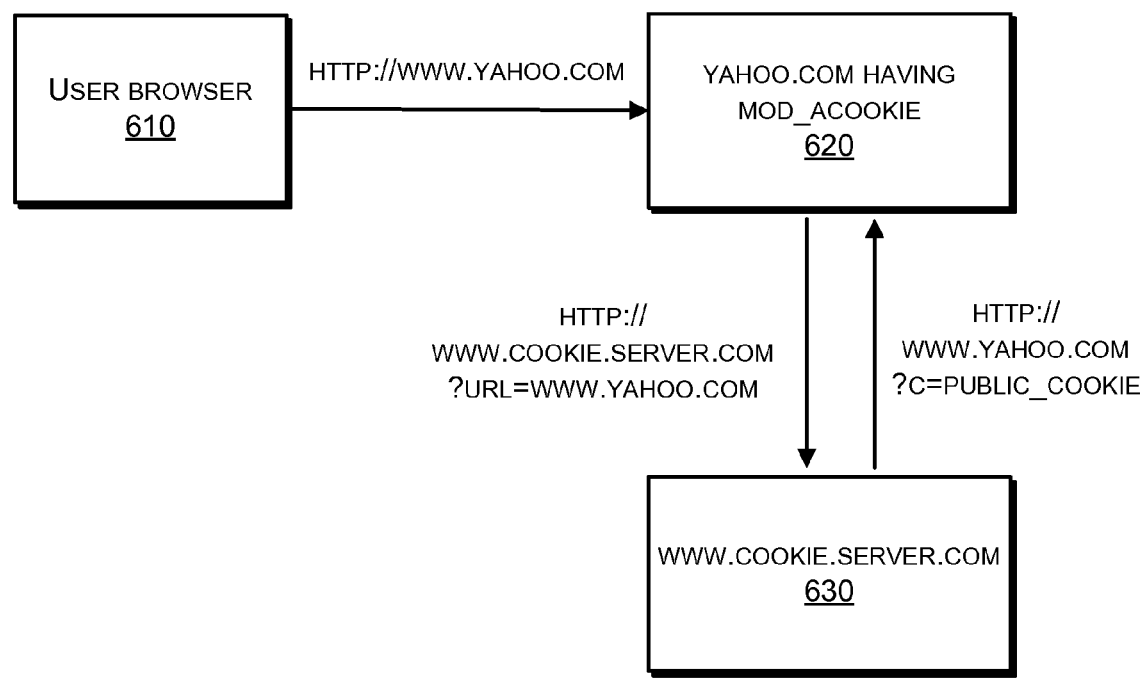
FIG. 6 shows a structural diagram of an exemplary system for web access using cross-domain cookie in accordance with one embodiment.

FIG. 6 illustrates an exemplary embodiment of the method based on the above system for web access using cross-domain cookie. As illustrated, the client is a user browser 610. The operator server 620 is Yahoo.com which has a cookie processing module mod_acookie installed therein. The cookie server 630 is represented by www.cookie.server.com. When the user tries to access www.yahoo.com through user browser 610, mod_acookie of the operator server 620 of yahoo.com examines the request first. If mod_acookie finds that the user is accessing www.yahoo.com for the first time and has no public cookie recognizing yahoo.com, it redirects the request to the cookie server 630 by rewriting the original request http://www.yahoo.com into a redirected request http://www.cookie.server.com?url=www.yahoo.com.

Upon receiving the redirected request, cookie.server.com 630 creates a cookie named public_cookie, and redirects the request back to the operator server 620 yahoo.com by rewriting the request as www.yahoo.com?c=public_cookie. This redirected request carries the cookie "public_cookie" created by the cookie.server.com.

Upon receiving the redirected request, mod_acookie of the server of yahoo.com writes domain name yahoo.com into the public cookie "public_cookie" so that public_cookie recognizes yahoo.com in the next visit of the same client. In order to do this, mod_acookie writes (or instructs the user browser 610 to write) public_cookie into the cookie registry on the user's computer. The public_cookie is saved under yahoo.com which is the domain name being accessed by the user through user browser 610, and as a result, when the same user visits yahoo.com the next time, the saved public_cookie recognizes the domain name yahoo.com and allows the operator server 620 of yahoo.com to obtain using information contained in the public_cookie. This completes the registration of the public cookie.

In order to facilitate tracking of the user activities, operator server 620 may further associate itself (or a domain associated therewith) with the public_cookie and establish a data record for the associated user to keep user activity information such as the number of visits, duration of the visit, webpages visited, etc. In practice, as a user accesses a certain website, web address is redirected to the cookie server for acquiring a public cookie if corresponding access request does not have the public cookie. Upon successful acquisition, the cookie server redirects web address back to the web address that the user originally accessed. Each website may obtain a unique public cookie for a user from the cookie server, and can track activities of the user throughout entire network using this public cookie. In other words, each operator server like yahoo.com maintains its own data record for the associated user. But because the same user is consistently identified through the public cookie generated and registered in the above manner regardless of the website visited, it is possible to collectively track use activities on different domains over the network.

The benefit of using a cookie server is that although the client may access multiple operator servers having different domain names and different websites, the public cookie is always created by the cookie server which is able to consistently assign a unique identification (e.g., the name or ID value) to the same client regardless of which operator server or website the client is trying to access. Upon redirecting through the operator server, the client has a direct handshake with the cookie server. This makes it possible for the cookie server to generate a consistent identification for the client for its accesses to operator servers of different domains without requiring the operator server to separately transmit any client information during redirecting. In this manner, when the client has access multiple operator servers of different domain names, a group of public cookies sharing a common client (by identifying the same client in a name value or ID value in the cookie) is stored in the client, each under a respective domain name. The group of public cookies sharing the same client may be collectively seen as the public cookie associated with the client.

From the exemplary embodiments described above, it is understood that the disclosed method and system may be implemented using software and universal hardware platform, or can be implemented using hardware only. However, in many instances, implementation using a combination of software and hardware is preferred. Based on this understanding, the technical scheme of the present disclosure, or portions contributing to existing technologies, may be implemented in the form of software products which are stored in a storage media. The software includes instructions for a computing device (e.g., a personal computer, a server or a networked device) to execute the method described in the exemplary embodiments of the current disclosure.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method for web access using cross-domain cookie, the method comprising:
   receiving at an operator server an access request of a client;
   providing, by the operator server, a redirect request for redirecting the access request from the operator server to a cookie server;
   generating a public cookie by the cookie server, wherein the public cookie includes a shared identifier that uniquely identifies the client over a plurality of domains and becomes one of a group of public cookies commonly identifying, via the shared identifier, the client and used by the client for accessing a plurality of operator servers, over the plurality of domains, each one of the operator servers recognizable by a respective one of the group of public cookies, the plurality of operator servers including the operator server;
   providing, by the cookie server, a redirect response that includes the public cookie for re-redirecting the access request, with the public cookie, back to the operator server;
   providing the operator server with the public cookie via the re-redirected access request; and
   binding the public cookie with the operator server and writing the public cookie into the client by the-operator server.

2. The method as recited in claim 1, wherein the public cookie identifies the client using a name-value created for the client and assigned to the public cookie.

3. The method as recited in claim 1, wherein the group of public cookies are each bound to a respective one of the plurality of operator servers having different domains.

4. The method as recited in claim 3, wherein the group of public cookies are used for tracking activities of the client through the plurality of operator servers having different domains over a network.

5. The method as recited in claim 1, further comprising: tracking activities of the client by the operator server.

6. The method as recited in claim 1, further comprising:
tracking activities of the client by each operator server of the plurality of operator servers; and
tracking cross domain activities of the client by collecting results of activities of the client tracked by each operator server of the plurality of operator servers.

7. The method as recited in claim 1, wherein binding the public cookie with the operator server comprises storing a value of the public cookie under the operator server's domain.

8. A method for web access using cross-domain cookie, the method comprising:
providing in an operator server a cookie processing module used for public cookie detection;
receiving at the operator server an access request of a client;
determining by the public cookie processing module of the operator server whether the access request includes a public cookie, and if negative obtaining the public cookie from a cookie server, wherein the public cookie is one of a group of public cookies adapted to access multiple operator servers, over a plurality of domains, that are recognized by the group of public cookies, wherein each public cookie of the group of public cookies includes a shared identifier that uniquely identifies the client over the plurality of domains; and
storing, by the operator server, the public cookie into the client and binding the public cookie with the operator server using the cookie processing module of the operator server, wherein the client stores the group of public cookies.

9. The method for web access using cross-domain cookie as recited in claim 8, the method further comprises:
responsive to determining that the access request includes a public cookie, determining whether the public cookie has expired, and if expired, obtaining a new public cookie from the cookie server.

10. The method for web access using cross-domain cookie as recited in claim 8, further comprising:
specifying a ratio for obtaining the public cookie.

11. A system for web access using cross-domain cookie, the system comprising:
a hardware cookie server configured to provide public cookies for clients; and
a hardware operator server in communication with the hardware cookie server over a network and including a cookie processing module, wherein the hardware operator server is adapted to receive an access request from a respective client and to receive new and updated cookies for clients, the cookie processing module is adapted to determine whether the access request includes a respective public cookie, and if negative send a redirect request for obtaining a respective new public cookie for the hardware operator server, the respective new public cookie being one of a group of public cookies that include a shared identifier that uniquely identifies the client over a plurality of domains, the group of public cookies allowing accessing multiple hardware operator servers, over the plurality of domains, that are recognized by the group of public cookies, and the cookie server is adapted to receive the redirect request, and to generate and provide the respective new public cookie to the hardware operator server.

12. The system for web access using cross-domain cookie as recited in claim 11, wherein the cookie processing module comprises:
a receiving sub-module, used for receiving the access request of the client; a
determination sub-module, used for determining whether the access request includes the respective public cookie;
an acquisition sub-module, used for obtaining the respective new public cookie from the hardware cookie server; and
a binding sub-module, used for storing the respective new public cookie into the client and binding the respective new public cookie with the hardware operator server, wherein the client stores the group of public cookies.

13. The system for web access using cross-domain cookie as recited in claim 12, wherein the cookie processing module further comprises:
a validity determination sub-module, used for determining whether the respective public cookie has expired, and for triggering the acquisition sub-module if the respective public cookie has expired.

14. The system for web access using cross-domain cookie as recited in claim 12, wherein the cookie processing module further comprises:
a request ratio control sub-module, used for specifying a ratio for obtaining public cookie.

15. The system for web access using cross-domain cookie as recited in claim 12, wherein the cookie server comprises:
a redirect request receiving module, used for receiving a redirect request from the hardware operator server; and
a public cookie sending module, used for sending a redirect response including the respective new public cookie to the hardware operator server.

16. The system for web access using cross-domain cookie as recited in claim 15, wherein the cookie server further comprises:
a public cookie creation module, used for creating the respective new public cookie for the client.

* * * * *